US012269924B2

(12) United States Patent
Lai et al.

(10) Patent No.: US 12,269,924 B2
(45) Date of Patent: Apr. 8, 2025

(54) POLYIMIDE FILM AND MANUFACTURING METHOD THEREOF

(71) Applicant: MICROCOSM TECHNOLOGY CO., LTD., Tainan (TW)

(72) Inventors: Bo Hung Lai, Tainan (TW); Wei Che Tang, Tainan (TW); Tang Chieh Huang, Tainan (TW)

(73) Assignee: MICROCOSM TECHNOLOGY CO., LTD., Tainan (TW)

( * ) Notice: Subject to any disclaimer, the term of this patent is extended or adjusted under 35 U.S.C. 154(b) by 618 days.

(21) Appl. No.: 17/623,397

(22) PCT Filed: May 14, 2020

(86) PCT No.: PCT/CN2020/090321
§ 371 (c)(1),
(2) Date: Dec. 28, 2021

(87) PCT Pub. No.: WO2021/226951
PCT Pub. Date: Nov. 18, 2021

(65) Prior Publication Data
US 2022/0372227 A1    Nov. 24, 2022

(51) Int. Cl.
*C08G 73/10* (2006.01)
*C08J 7/04* (2020.01)
*C08L 79/08* (2006.01)

(52) U.S. Cl.
CPC ..... *C08G 73/1064* (2013.01); *C08G 73/1042* (2013.01); *C08G 73/1046* (2013.01); *C08J 7/0427* (2020.01); *C08L 79/08* (2013.01); *C08L 2201/10* (2013.01); *C08L 2203/16* (2013.01); *C08L 2203/206* (2013.01)

(58) Field of Classification Search
CPC ..... C08L 79/08; C08J 2379/08; C08J 7/0427; C08G 73/1078; C08G 73/10; C08G 73/1064; C08G 73/1042
See application file for complete search history.

(56) References Cited

FOREIGN PATENT DOCUMENTS

| CN | 101679633 A | 3/2010 | | |
|----|----|----|----|----|
| CN | 102382303 A | 3/2012 | | |
| CN | 102532895 A | 7/2012 | | |
| CN | 103102489 A | 5/2013 | | |
| CN | 106029743 A | 10/2016 | | |
| CN | 107428934 A | 12/2017 | | |
| CN | 108586744 A | 9/2018 | | |
| CN | 109957109 A | * | 7/2019 | ......... C08G 73/1021 |
| JP | 2015-229691 A | 12/2015 | | |
| TW | I332580 B | 11/2010 | | |
| WO | WO2016/021746 A1 | 2/2016 | | |

OTHER PUBLICATIONS

International Search Report for PCT Patent App. No. PCT/CN2020/090321 (Feb. 5, 2021).

* cited by examiner

*Primary Examiner* — Gregory Listvoyb
(74) *Attorney, Agent, or Firm* — Cermak & McGowan LLP; Shelly Guest Cermak

(57) ABSTRACT

The present invention provides a polyimide film, which comprises a polyimide having a structure represented by formula (I):

$$\left[ A-N\underset{\underset{O}{\|}}{\overset{\overset{O}{\|}}{\diagdown}}R_1\underset{\underset{O}{\|}}{\overset{\overset{O}{\|}}{\diagdown}}N \right]_n \left[ A-N\underset{\underset{O}{\|}}{\overset{\overset{O}{\|}}{\diagdown}}R_2\underset{\underset{O}{\|}}{\overset{\overset{O}{\|}}{\diagdown}}N \right]_m,$$ (I)

in which A is a residue group of an aromatic diamine containing a sulfonyl group in its main chain moiety, $R_1$ is a residue group of an aromatic dianhydride, $R_2$ is a residue group of an aliphatic dianhydride, m and n are each independently a positive integer, a diamine monomer constituting the polyimide is only composed of the aromatic diamine containing the sulfonyl group in its main chain moiety, and the polyimide is surface-dried at 75° C. to 155° C. in the process of forming the polyimide film. The polyimide film of the present invention has transparency and UV absorption properties.

7 Claims, No Drawings

POLYIMIDE FILM AND MANUFACTURING METHOD THEREOF

This application is a national phase entry under 35 U.S.C. § 371 of PCT Patent Application No. PCT/CN2020/090321, filed on May 14, 2020, which is incorporated by reference.

BACKGROUND OF THE INVENTION

Field of the Invention

The present invention relates to a polyimide film and, in particular, to a polyimide film that is colorless and transparent, and has low UV absorption and small phase difference.

Description of the Prior Art

With the development of OLED technology, glass substrates have evolved from rigid glass substrates to flexible glass substrates. Since a flexible OLED display has the characteristics of light, thin and bendable, the substrates used today are not traditional glass substrates any more, but thin and flexible plastic film substrates instead.

Polyimide polymers are formed by the condensation and polymerization of two kinds of monomers, the dianhydride and the diamine. At present, polyimide polymers with thermal stability are mostly aromatics, whose planar rigid structure provides polyimide materials with excellent heat resistance, mechanical strength and chemical resistance. However, because the dianhydride group acts as the electron donor in the polymer structure and the diamine group acts as the electron acceptor, the plane resonance of the polyimide polymers is prone to cause intra-molecular and intermolecular charge transfer, resulting in yellowing phenomenon of the aromatic polyimide film, which limits its application.

To reduce the charge transfer phenomenon, generally, a linkage group, such as (—O—), (—SO$_2$—) (—CO—), (—CH$_2$—), (—C(CF$_3$)$_2$—), etc., may be introduced to make the main chain flexible; or some larger groups may be introduced to destroy the stacking situation, which achieves the effect as well.

However, in the touch applications of the flexible display, the wires used have been changed from traditional ITO ceramic materials to silver nanowires or metal grids such that the metal wires will be prone to break during the UV aging test. Therefore, in addition to being transparent, the film also needs to have UV absorption to protect the metal wires. Although TW 1332580 discloses a transparent polyimide film with low birefringence, the film does not have the function of UV absorption. WO2016021746A1 discloses a transparent polyimide film as well, nevertheless, the yellowness of the film is too high.

SUMMARY OF THE INVENTION

In view of the above technical problems, an object of the present invention is to provide a polyimide film that has not only transparency and UV absorption properties, but also low phase difference.

To achieve the above object, the present invention provides a polyimide film comprising a polyimide having a structure represented by formula (I):

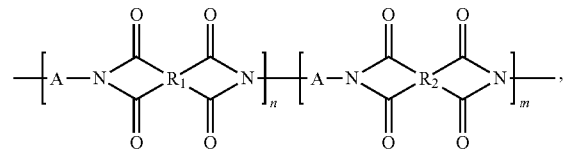

wherein A is a residue group of an aromatic diamine containing a sulfonyl group in its main chain moiety, $R_1$ is a residue group of an aromatic dianhydride, $R_2$ is a residue group of an aliphatic dianhydride, m and n are each independently a positive integer, a diamine monomer constituting the polyimide is only composed of the aromatic diamine containing the sulfonyl group in its main chain moiety, and the polyimide is surface-dried at 75° C. to 155° C. in the process of forming the polyimide film.

Preferably, the aromatic diamine containing the sulfonyl group includes 4,4'-bis(3-aminophenoxy) diphenyl sulfone, 4,4'-bis(4-aminophenoxy) diphenyl sulfone, 4,4-diaminodiphenyl sulfone or 3,3 diaminodiphenyl sulfone.

Preferably, the aromatic dianhydride includes 3,3',4,4'-biphenyltetracarboxylic dianhydride, 3,3',4,4'-tetracarboxylic benzophenone dianhydride, 2,3,3',4-biphenyltetracarboxylic dianhydride, 2,3,3',4-tetracarboxylic benzophenone dianhydride, bisphenol A type diether dianhydride or 4,4'-oxydiphthalic anhydride.

Preferably, the aliphatic dianhydride includes bicyclo[2.2.2]oct-7-ene-2,3,5,6-tetracarboxylic dianhydride, 1,2,4,5-cyclohexanetetracarboxylic dianhydride, cyclobutane tetracarboxylic dianhydride or other hydrogenated aromatic dianhydrides.

Preferably, a ratio of the n to them ranges from 1:19 to 3:7.

Preferably, the polyimide film has a transmittance of less than 10% with respect to 360 nm visible light and has a yellowness of less than 3.

Preferably, the polyimide film has a phase difference of less than or equal to 25, a thermal expansion coefficient of less than 50 ppm/° C., and a glass transition temperature of greater than 230° C.

The present invention further provides a manufacturing method of a polyimide film, which comprises the following steps: coating a substrate with a solution containing polyimide to obtain a coated substrate; and surface-drying the coated substrate at 75° C. to 155° C. and then performing a heat treatment at a temperature of greater than or equal to 200° C.; wherein the polyimide has a structure represented by formula (I):

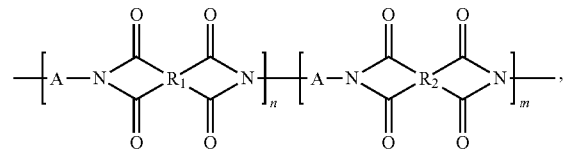

wherein A is a residue group of an aromatic diamine containing a sulfonyl group in its main chain moiety, $R_1$ is a residue group of an aromatic dianhydride, $R_2$ is a residue group of an aliphatic dianhydride, m and n are each independently a positive integer, and a diamine monomer constituting the polyimide is only composed of the aromatic diamine containing the sulfonyl group in its main chain moiety.

In the polyimide film provided by the present invention, the polyimide used is copolymerized by at least one kind of diamine monomer and at least two kinds of dianhydride monomer. By introducing a specific monomer structure into the polyimide, the prepared polyimide film has not only transparency and low yellowness, but also UV absorption property and low phase difference.

DETAILED DESCRIPTION OF THE EMBODIMENTS

The present invention provides a polyimide film comprising a polyimide, which has a structure represented by formula (I):

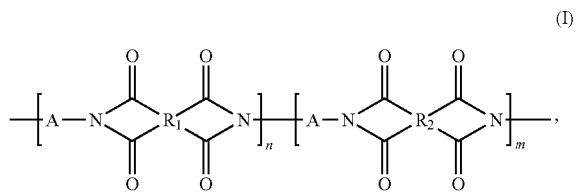

in which A is a residue group of an aromatic diamine containing a sulfonyl group in its main chain moiety, $R_1$ is a residue group of an aromatic dianhydride, $R_2$ is a residue group of an aliphatic dianhydride, m and n are each independently a positive integer, a diamine monomer constituting the polyimide is only composed of the aromatic diamine containing the sulfonyl group in its main chain moiety, and the polyimide is surface-dried at 75° C. to 155° C. in the process of forming the polyimide film.

The polyimide of the present invention is formed by copolymerization of at least one kind of aromatic diamine monomer and at least two kinds of dianhydride monomer, in which one kind of the dianhydride monomer is the aromatic dianhydride monomer, the other kind of the dianhydride monomer is the aliphatic dianhydride monomer, and the aromatic diamine monomer contains sulfonyl group in its main chain moiety.

In the present invention, the aromatic diamine monomer of the polyimide can be derived from two or more diamine monomers, which may be the same or different with the proviso that all the diamine monomers must contain sulfonyl group in its main chain moiety. For example, in formula (I), the A in the repeating unit n may be the same or different from the A in the repeating unit m, but the As must be the residues of all the aromatic diamines containing sulfonyl groups in their main chain moieties.

In a preferred embodiment, the aromatic diamine containing sulfonyl group (—$SO_2$—) includes 4,4'-bis(3-aminophenoxy) diphenyl sulfone, 4,4'-bis(4-aminophenoxy) diphenyl sulfone, 4,4 diaminodiphenyl sulfone, or 3,3 diaminodiphenyl sulfone.

In a preferred embodiment, the aromatic dianhydride includes 3,3',4,4'-biphenyltetracarboxylic dianhydride, 3,3',4,4'-tetracarboxylic benzophenone dianhydride, 2,3,3',4-biphenyltetracarboxylic dianhydride, 2,3,3',4-tetracarboxylic benzophenone dianhydride, bisphenol A type diether dianhydride or 4,4-oxydiphthalic anhydride.

In a preferred embodiment, the aliphatic dianhydride includes bicyclo[2.2.2]oct-7-ene-2,3,5,6-tetracarboxylic dianhydride, 1,2,4,5-cyclohexanetetracarboxylic dianhydride, cyclobutane tetracarboxylic dianhydride or other hydrogenated aromatic tetracarboxylic dianhydrides.

In a preferred embodiment, a ratio of the n to the m ranges from 1:19 to 3:7 (such as 2:8).

Preferably, the polyimide film of the present invention has a transmittance of less than 10% with respect to 360 nm visible light and has a yellowness of less than 3, more preferably a yellowness of less than 1.9, and particularly preferably a yellowness of less than 1.55.

The polyimide film of the present invention has a phase difference of less than or equal to 25 (such as less than or equal to 24, less than or equal to 20, less than or equal to 14, or less than or equal to 10), a thermal expansion coefficient of less than 50 ppm/° C. (such as less than 45 ppm/° C.), and a glass transition temperature of greater than 230° C. (such as greater than 239° C., greater than 244° C., greater than 250° C. or greater than 270° C.).

In the present invention, a manufacturing method of a polyimide film comprises: coating a substrate with a solution containing polyimide to obtain a coated substrate; surface-drying the coated substrate at 75° C. to 155° C., and then performing a heat treatment at a temperature of greater than or equal to 200° C.

The surface drying is preferably carried out at 80° C. to 150° C., such as at 80° C., 90° C., 100° C., 110° C., 120° C., 130° C., 140° C. or 150° C. In some embodiments, the temperature for surface drying is between any two of the aforementioned values, such as between 90 and 130° C., between 90° C. and 120° C., or between 100° C. and 120° C. The heat treatment is preferably carried out at 200° C. to 250° C., such as 200° C., 205° C., 210° C., 215° C., 220° C., 225° C., 230° C., 235° C., 240° C., 245° C. or 250° C. In some embodiments, the temperature for performing the heat treatment is between any two of the aforementioned values, such as between 210° C. and 240° C. or between 210° C. and 230° C.

In a preferred embodiment, the solution is obtained by dissolving at least one kind of aromatic diamine and at least two kinds of dianhydrides in a solvent for one-step copolymerization, in which one kind of the dianhydride monomer is the aromatic dianhydride monomer, the other kind of the dianhydride monomer is the aliphatic dianhydride monomer, and the aromatic diamine monomer contains sulfonyl group in its main chain.

The solvent is not particularly limited, as long as it can dissolve the reaction components. The solvent may be m-cresol, N-methylpyrrolidone (NMP), γ-butyrolactone (γ-GBL) or dimethyl sulfoxide (DMSO), etc., and preferably it is γ-butyrolactone (γ-GBL).

The coating method is not particularly limited and may be drop coating, blade coating, spin coating, dip coating or the like.

In the present invention, the polyimide is preferably soluble in the aforementioned solvent.

In order to highlight the efficacy of the present application, the inventors completed the examples and comparative examples in the manner set out below. The following examples and comparative examples will further illustrate the present invention. However, these examples and comparative examples are not intended to limit the scope of the present invention. All the changes and modifications made by people having ordinary skill in the art without departing from the spirit of the present invention fall within the scope of the present invention.

Example 1

43.23 g (0.1 mol) of 4,4'-bis(3-aminophenoxy)diphenyl sulfone (m-BAPS), 6.20 g (0.02 mol) of 4,4-oxydiphthalic anhydride (OPDA), 19.86 g (0.08 mol) of bicyclo[2.2.2]oct-7-ene-2,3,5,6-tetracarboxylic dianhydride (B1317), 104 g of γ-butyrolactone (γ-GBL) and 0.83 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 104 g of γ-butyrolactone was added to obtain a polyimide solution.

The polyamic acid solution mentioned above was filtered with a filter head, coated on the glass substrate by blade coating method or drop coating method, and then surface-dried in an oven to remove the solvent on the surface of the coating. Afterwards, the film curing process (i.e., heat treatment) was performed in a high-temperature oven to remove the solvent. The thickness of the coating (i.e., the film) was kept at 10 μm. The baking conditions of surface drying was baking at 80° C. for 15 minutes. The heat treatment conditions for curing were baking at 220° C. for 60 minutes.

Example 2

43.23 g (0.1 mol) of 4,4'-bis(3-aminophenoxy)diphenyl sulfone (m-BAPS), 10.41 g (0.02 mol) of bisphenol A type diether dianhydride(BPADA), 19.86 g (0.08 mol) of bicyclo[2.2.2]oct-7-ene-2,3,5,6-tetracarboxylic dianhydride (B1317), 110 g of γ-butyrolactone (γ-GBL) and 0.88 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 110 g of γ-butyrolactone was added to obtain a polyimide solution.

All the preparation method, baking conditions of surface drying and heat treatment conditions of the polyimide film of Example 2 were the same as that of Example 1.

Example 3

43.23 g (0.1 mol) of 4,4'-bis(3-aminophenoxy)diphenyl sulfone (m-BAPS)), 6.20 g (0.02 mol) of 4,4-oxydiphthalic anhydride (OPDA), 17.93 g (0.08 mol) of 1,2,4,5-cyclohexanetetracarboxylic dianhydride(HPMDA), 101 g of γ-butyrolactone (γ-GBL) and 0.81 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 101 g of γ-butyrolactone was added to obtain a polyimide solution.

All the preparation method, baking conditions of surface drying and heat treatment conditions of the polyimide film of Example 3 were the same as that of Example 1.

Example 4

43.23 g (0.1 mol) of 4,4'-bis(3-aminophenoxy)diphenyl sulfone (m-BAPS)), 10.41 g (0.02 mol) of bisphenol A type diether dianhydride(BPADA), 17.93 g (0.08 mol) of 1,2,4,5-cyclohexanetetracarboxylic dianhydride(HPMDA), 107 g of γ-butyrolactone (γ-GBL) and 0.86 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 107 g of γ-butyrolactone was added to obtain a polyimide solution.

All the preparation method, baking conditions of surface drying and heat treatment conditions of the polyimide film of Example 4 were the same as that of Example 1.

Example 5

43.23 g (0.1 mol) of 4,4'-bis(3-aminophenoxy)diphenyl sulfone (m-BAPS)), 8.83 g (0.03 mol) of 3,3',4,4'-biphenyltetracarboxylic dianhydride(BPDA), 15.69 g (0.07 mol) of 1,2,4,5-cyclohexanetetracarboxylic dianhydride (HPMDA), 102 g of γ-butyrolactone (γ-GBL) and 0.81 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 102 g of γ-butyrolactone was added to obtain a polyimide solution.

All the preparation method, baking conditions of surface drying and heat treatment conditions of the polyimide film of Example 5 were the same as that of Example 1.

Example 6

43.23 g (0.1 mol) of 4,4'-bis(3-aminophenoxy)diphenyl sulfone (m-BAPS)), 8.83 g (0.03 mol) of 3,3',4,4'-biphenyltetracarboxylic dianhydride (BPDA), 15.69 g (0.07 mol) of 1,2,4,5-cyclohexanetetracarboxylic dianhydride (HPMDA), 102 g of γ-butyrolactone (γ-GBL) and 0.81 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 102 g of γ-butyrolactone was added to obtain a polyimide solution.

The preparation method of the polyimide film of Example 6 were the same as that of Example 1. The baking conditions of surface drying were baking at 100° C. for 15 min, and the heat treatment conditions for curing were baking at 220° C. for 60 min.

Example 7

43.23 g (0.1 mol) of 4,4'-bis(3-aminophenoxy)diphenyl sulfone (m-BAPS), 8.83 g (0.03 mol) of 3,3',4,4'-biphenyltetracarboxylic dianhydride (BPDA), 15.69 g (0.07 mol) of 1,2,4,5-cyclohexanetetracarboxylic dianhydride (HPMDA), 102 g of γ-butyrolactone (γ-GBL) and 0.81 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 102 g of γ-butyrolactone was added to obtain a polyimide solution.

The preparation method of the polyimide film of Example 7 were the same as that of Example 1. The baking conditions of surface drying were baking at 120° C. for 15 min, and the heat treatment conditions for curing were baking at 220° C. for 60 min.

Example 8

43.23 g (0.1 mol) of 4,4'-bis(3-aminophenoxy)diphenyl sulfone (m-BAPS)), 8.83 g (0.03 mol) of 3,3',4,4'-biphenyltetracarboxylic dianhydride (BPDA), 15.69 g (0.07 mol) of 1,2,4,5-cyclohexanetetracarboxylic dianhydride (HPMDA), 102 g of γ-butyrolactone (γ-GBL) and 0.81 g of triethylamine were added in a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 102 g of γ-butyrolactone was added to obtain a polyimide solution.

The preparation method of the polyimide film of Example 8 were the same as that of Example 1. The baking conditions of surface drying were baking at 150° C. for 20 min, and the heat treatment conditions were baking at 220° C. for 60 min.

Example 9

43.23 g (0.1 mol) of 4,4'-bis(3-aminophenoxy)diphenyl sulfone (m-BAPS)), 5.88 g (0.02 mol) of 2,3,3',4'-biphenyltetracarboxylic dianhydride (a-BPDA), 17.93 g (0.08 mol) of 1,2,4,5-cyclohexanetetracarboxylic dianhydride (HPMDA), 101 g of γ-butyrolactone (γ-GBL) and 0.80 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 101 g of γ-butyrolactone was added to obtain a polyimide solution.

All the preparation method, baking conditions of surface drying and heat treatment conditions of the polyimide film of Example 9 were the same as that of Example 1.

Example 10

24.83 g (0.1 mol) of 3,3'-diaminodiphenyl sulfone (3,3-DDS), 8.83 g (0.03 mol) of 3,3',4,4'-biphenyltetracarboxylic dianhydride (BPDA), 15.69 g (0.07 mol) of 1,2,4,5-cyclohexanetetracarboxylic dianhydride (HPMDA), 73 g of γ-butyrolactone (γ-GBL) and 0.58 g of triethylamine were added in a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 73 g of γ-butyrolactone was added to obtain a polyimide solution.

All the preparation method, baking conditions of surface drying and heat treatment conditions of the polyimide film of Example 10 were the same as that of Example 1.

Example 11

43.23 g (0.1 mol) of 4,4'-bis(3-aminophenoxy)diphenyl sulfone (m-BAPS), 6.44 g (0.02 mol) of 3,3',4,4'-benzophenonetetracarboxylic dianhydride(BTDA), 19.86 g (0.08 mol) of bicyclo[2.2.2]oct-7-ene-2,3,5,6-tetracarboxylic dianhydride (B1317), 104 g of γ-butyrolactone (γ-GBL) and 0.83 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 104 g of γ-butyrolactone was added to obtain a polyimide solution.

All the preparation method, baking conditions of surface drying and heat treatment conditions of the polyimide film of Example 11 were the same as that of Example 1.

Example 12

43.23 g (0.1 mol) of 4,4'-bis(3-aminophenoxy)diphenyl sulfone (m-BAPS), 6.44 g (0.02 mol) of 3,3',4,4'-benzophenonetetracarboxylic dianhydride (BTDA), 17.93 g (0.08 mol) of 1,2,4,5-cyclohexanetetracarboxylic dianhydride (HPMDA), 101 g of γ-butyrolactone (γ-GBL) and 0.83 g of triethylamine were added in a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 101 g of γ-butyrolactone was added to obtain a polyimide solution.

All the preparation method, baking conditions of surface drying and heat treatment conditions of the polyimide film of Example 12 were the same as that of Example 1.

Comparative Examples 1

43.23 g (0.1 mol) of 4,4'-bis(3-aminophenoxy)diphenyl sulfone (m-BAPS), 6.73 g (0.03 mol) of 1,2,4,5-cyclohexanetetracarboxylic dianhydride (HPMDA), 17.37 g (0.07 mol) of bicyclo[2.2.2]oct-7-ene-2,3,5,6-tetracarboxylic dianhydride (B1317), 101 g of γ-butyrolactone (γ-GBL) and 0.81 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 101 g of γ-butyrolactone was added to obtain a polyimide solution.

All the preparation method, baking conditions of surface drying and heat treatment conditions of the polyimide film of Comparative Example 1 were the same as that of Example 1.

Comparative Example 2

3.23 g (0.1 mol) of 4,4'-bis(3-aminophenoxy)diphenyl sulfone (m-BAPS), 17.37 g (0.1 mol) of bicyclo[2.2.2]oct-7-ene-2,3,5,6-tetracarboxylic dianhydride (B1317), 91 g of γ-butyrolactone (γ-GBL) and 0.72 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 91 g of γ-butyrolactone was added to obtain a polyimide solution.

All the preparation method, baking conditions of surface drying and heat treatment conditions of the polyimide film of Comparative Example 2 were the same as that of Example 1.

Comparative Example 3

34.60 g (0.08 mol) of 4,4'-bis(3-aminophenoxy)diphenyl sulfone (m-BAPS), 6.40 g (0.02 mol) of 2,2'-bis(trifluoromethyl)benzidine (TFMB), 22.43 g (0.1 mol) of 1,2,4,5-cyclohexanetetracarboxylic dianhydride (HPMDA), 101.5 g of γ-butyrolactone (γ-GBL) and 0.81 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 101.5 g of γ-butyrolactone was added to obtain a polyimide solution.

All the preparation method, baking conditions of surface drying and heat treatment conditions of the polyimide film of Comparative Example 3 were the same as that of Example 1.

Comparative Example 4

3.23 g (0.1 mol) of 4,4'-bis(3-aminophenoxy)diphenyl sulfone (m-BAPS), 44.43 g (0.1 mol) of 4,4'-(hexafluoroisopropylidene)diphthalic anhydride (6FDA), 123.44 g of γ-butyrolactone (γ-GBL) and 0.99 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 123.44 g of γ-butyrolactone was added to obtain a polyimide solution.

All the preparation method, baking conditions of surface drying and heat treatment conditions of the polyimide film of Comparative Example 4 were the same as that of Example 1.

Comparative Example 5

34.60 g (0.08 mol) of 4,4'-bis(3-aminophenoxy)diphenyl sulfone (m-BAPS), 6.40 g (0.02 mol) of 2,2'-bis(trifluoromethyl)benzidine (TFMB), 8.83 g (0.03 mol) of 3,3',4,4'-biphenyltetracarboxylic dianhydride (BPDA), 15.69 g (0.07 mol) of 1,2,4,5-cyclohexanetetracarboxylic dianhydride (HPMDA), 102 g of γ-butyrolactone (γ-GBL) and 0.81 g of triethylamine were added in a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 102 g of γ-butyrolactone was added to obtain a polyimide solution.

All the preparation method, baking conditions of surface drying and heat treatment conditions of the polyimide film of Comparative Example 5 were the same as that of Example 1.

Comparative Example 6

32.96 g (0.09 mol) of 2,2-bis(3-amino-4-hydroxyphenyl) hexafluoropropane (AHHFP), 2.00 g (0.01 mol) of 4,4'-oxydianiline (ODA), 32.2 g (0.1 mol) of 3,3',4,4'-benzophenonetetracarboxylic dianhydride (BTDA) and 201.5 g of γ-butyrolactone (γ-GBL) were added into a 500 mL reaction flask equipped with a mechanical stirrer and a nitrogen inlet to obtain a solution. Under nitrogen atmosphere, the above solution was reacted at room temperature for 24 hours to obtain a polyimide solution.

All the preparation method, baking conditions of surface drying and heat treatment conditions of the polyimide film of Comparative Example 6 were the same as that of Example 1.

Comparative Example 7

21.62 g (0.05 mol) of 4,4'-bis(3-aminophenoxy)diphenyl sulfone (m-BAPS), 16 g (0.05 mol) of 2,2'-bis(trifluoromethyl)benzidine (TFMB), 32.2 g (0.1 mol) of 3,3',4,4'-benzophenonetetracarboxylic dianhydride (BTDA) and 209.5 g of γ-butyrolactone (γ-GBL) were added into a 500 mL reaction flask equipped with a mechanical stirrer and a nitrogen inlet to obtain a solution. Under nitrogen atmosphere, the above solution was reacted at room temperature for 24 hours to obtain a polyimide solution.

All the preparation method, baking conditions of surface drying and heat treatment conditions of the polyimide film of Comparative Example 7 were the same as that of Example 1.

Comparative Example 8

25.92 g (0.05 mol) of 2,2-bis[4-(4-aminophenoxy)phenyl]-hexafluoropropane (6FBAPP), 12.42 g (0.05 mol) of 3,3'-diaminodiphenylsulfone (3,3-DDS), 32.2 g (0.1 mol) of 3,3',4,4'-benzophenonetetracarboxylic dianhydride (BTDA) and 211.6 g of γ-butyrolactone (γ-GBL) were added into a 500 mL reaction flask equipped with a mechanical stirrer and a nitrogen inlet to obtain a solution. Under nitrogen atmosphere, the above solution was reacted at room temperature for 24 hours to obtain a polyimide solution.

All the preparation method, baking conditions of surface drying and heat treatment conditions of the polyimide film of Comparative Example 8 were the same as that of Example 1.

Comparative Example 9

43.23 g (0.1 mol) of 4,4'-bis(3-aminophenoxy)diphenyl sulfone (m-BAPS), 8.83 g (0.03 mol) of 3,3',4,4'-biphenyltetracarboxylic dianhydride (BPDA), 15.69 g (0.07 mol) of 1,2,4,5-cyclohexanetetracarboxylic dianhydride (HPMDA), 102 g of γ-butyrolactone (γ-GBL) and 0.81 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 102 g of γ-butyrolactone was added to obtain a polyimide solution.

The preparation method of the polyimide film of Comparative Example 9 were the same as that of Example 1. The baking conditions of surface drying were baking at 40° C. for 15 min, and the heat treatment conditions for curing were baking at 220° C. for 60 min.

Comparative Example 10

43.23 g (0.1 mol) of 4,4'-bis(3-aminophenoxy)diphenyl sulfone (m-BAPS), 8.83 g (0.03 mol) of 3,3',4,4'-biphenyltetracarboxylic dianhydride (BPDA), 15.69 g (0.07 mol) of 1,2,4,5-cyclohexanetetracarboxylic dianhydride (HPMDA), 102 g of γ-butyrolactone (γ-GBL) and 0.81 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 102 g of γ-butyrolactone was added to obtain a polyimide solution.

The preparation method of the polyimide film of Comparative Example 10 were the same as that of Example 1. The baking conditions of surface drying were baking at 50°

C. for 15 min, and the heat treatment conditions for curing were baking at 220° C. for 60 min.

Comparative Example 11

43.23 g (0.1 mol) of 4,4'-bis(3-aminophenoxy)diphenyl sulfone (m-BAPS), 8.83 g (0.03 mol) of 3,3',4,4'-biphenyltetracarboxylic dianhydride (BPDA), 15.69 g (0.07 mol) of 1,2,4,5-cyclohexanetetracarboxylic dianhydride (HPMDA), 102 g of γ-butyrolactone (γ-GBL) and 0.81 g of triethylamine were added into a 500 mL reaction flask equipped with a mechanical stirrer and a nitrogen inlet to obtain a solution. Under nitrogen atmosphere, the above solution was polymerized at a reaction temperature of 190° C. for 4 hours. When the temperature dropped to 120° C., another 102 g of γ-butyrolactone was added to obtain a polyimide solution.

The preparation method of the polyimide film of Comparative Example 11 were the same as that of Example 1. The baking conditions of surface drying were baking at 60° C. for 15 min, and the heat treatment conditions for curing were baking at 220° C. for 60 min.

Hereinafter, the method for testing the properties of the polyimide film with a thickness of 10 μm of the present invention will be described.

<Thermal Expansion Coefficient> and <Glass Transition Temperature>

The CTE value and glass transition temperature (Tg) were measured from 50° C. to 200° C. with the thermomechanical analyzer (TA Instrument TMA Q400EM). Before the thermal analysis, all the polyimide films were subject to the heat treatment at 220° C. for 1 hour, and then the glass transition temperature was measured by TMA. In the film mode, the heating rate was 10° C./min and a constant load was applied at 30 mN. Similarly, the linear thermal expansion coefficient from 50 to 200° C. was measured using TMA, in which the load strain was 30 mN, and the heating rate was 10° C./min.

<Yellowness>

The value of yellow index YI of the cover substrate was measured using Nippon Denshoku COH 5500 in accordance with ASTM E313. For the yellow index YI, the tristimulus value (x, y, z) were obtained by measuring the transmittance of 400-700 nm light using the spectrophotometer, and the value of YI was calculated by the following formula.

$$YI = 100 \times (1.2769x - 1.0592z)/y$$

<Total Transmittance (TT) and Haze>

The total light transmittance and haze of the cover substrate were measured using Nippon Denshoku COH 5500 according to ASTM D1003.

<UV Absorption (T-360)>

The UV-Vis transmittance of the polyimide film with a thickness of 10 μm was measured at a wavelength of 360 nm using the UV-Vis spectrophotometer.

<Phase Difference>

The in-plane phase difference R0 and the thickness phase difference Rth of the transparent polyimide layer are measured using the X, Y, and Z modes of the photoelastic constant measuring device Kobra 21ADH manufactured by Oji Measuring Instruments Co., Ltd. The measuring temperature was set to 25° C., and the measuring wavelength was set to 529 nm. Specifically, a photoelastic constant measuring device was used to measure the refractive index of the polyimide film in the X, Y, and Z directions, and R0 and Rth are calculated by the following formulas.

$$\text{In-plane phase difference } R0 = (nx - ny) \times d$$

$$\text{Thickness phase difference } R\text{th} = [(nx+ny)/2 - nz] \times d$$

wherein nx, ny and nz are the refractive indices in the X, Y, and Z directions, respectively, and d is the film thickness.

The test results of the above properties are shown in Table 1.

TABLE 1

Table 1 Thermal and optical properties of polyimide film

| PI film | PI composition | Film baking condition Surface drying temperature (° C.) | Thermal properties Tg (° C.) | CTE (50-200° C.) (ppm/° C.) | Optical properties YI | Haze (%) | TT (%) | T-360 (%) | in-lane phase difference R0 (nm) | thickness phase difference Rth (nm) |
|---|---|---|---|---|---|---|---|---|---|---|
| Ex. 1 | mBAPS-B1317/OPDA(8:2) | 80 | 293 | 47.6 | 1.5 | 0.74 | 90.14 | 8.5 | 0.4 | 21.5 |
| Ex. 2 | mBAPS-B1317/BPADA(8:2) | 80 | 275 | 48.8 | 1.3 | 0.55 | 90.22 | 7 | 0.2 | 23.1 |
| Ex. 3 | mBAPS-HPMDA/OPDA(8:2) | 80 | 230 | 46.5 | 1.46 | 0.33 | 90.16 | 6.8 | 0.4 | 4.6 |
| Ex. 4 | mBAPS-HPMDA/BPADA(8:2) | 80 | 241 | 49.3 | 1.28 | 0.74 | 90.27 | 1.3 | 0.3 | 5.4 |
| Ex. 5 | mBAPS-HPMDA/BPDA(7:3) | 80 | 245 | 42.5 | 1.85 | 0.54 | 89.77 | 0 | 0.2 | 13.7 |
| Ex. 6 | mBAPS-HPMDA/BPDA(7:3) | 100 | 245 | 42.5 | 1.86 | 0.31 | 89.9 | 0 | 0.2 | 11.9 |
| Ex. 7 | mBAPS-HPMDA/BPDA(7:3) | 120 | 245 | 42.5 | 1.84 | 0.41 | 89.95 | 0 | 0.1 | 9.6 |
| Ex. 8 | mBAPS-HPMDA/BPDA(7:3) | 150 | 245 | 42.5 | 1.85 | 0.29 | 89.96 | 0 | 0.2 | 6.0 |
| Ex. 9 | mBAPS-HPMDA/a-BPDA(8:2) | 80 | 240 | 48.6 | 1.52 | 0.63 | 90.09 | 8.1 | 0.2 | 3.7 |
| Ex. 10 | 3,3-DDS-HPMDA/BPDA(7:3) | 80 | 260 | 41.1 | 1.43 | 0.92 | 90.16 | 0 | 0.5 | 5.8 |
| Ex. 11 | mBAPS-B1317/BTDA(8:2) | 80 | 280 | 49.6 | 2.9 | 0.82 | 90.01 | 6.3 | 0.2 | 4.4 |
| Ex. 12 | mBAPS-HPMDA/BTDA(8:2) | 80 | 230 | 44.7 | 2.84 | 0.52 | 90.02 | 8.8 | 0.3 | 7.8 |
| Comp. Ex. 1 | mBAPS-B1317/HPMDA(7:3) | 80 | 267 | 48.4 | 1.18 | 0.26 | 90.38 | 73 | 0.2 | 24.5 |
| Comp. Ex. 2 | mBAPS-B1317 | 80 | 277 | 45.5 | 1.57 | 0.19 | 90.23 | 76.8 | 0.2 | 35.3 |
| Comp. Ex. 3 | mBAPS/TFMB(8:2)-HPMDA | 80 | 286 | 33 | 2.48 | 0.13 | 89.94 | 73.5 | 0.3 | 73.0 |
| Comp. Ex. 4 | mBAPS-6FDA | 80 | 260 | 38 | 1.05 | 0.11 | 90.46 | 65 | 0.2 | 49.0 |
| Comp. Ex. 5 | mBAPS/TFMB(8:2)-HPMDA/BPDA(7:3) | 80 | 279 | 45.3 | 1.8 | 0.33 | 89.99 | 0 | 0.2 | 76.1 |
| Comp. Ex. 6 | AHHFP/ODA(9:1)-BTDA | 80 | 270 | 43 | 30.68 | 0.8 | 88.56 | 0 | 0.1 | 29.9 |
| Comp. Ex. 7 | mBAPS/TFMB(5:5)-BTDA | 80 | 277 | 40.5 | 22.86 | 0.82 | 88.9 | 0 | 0.4 | 18.5 |
| Comp. Ex. 8 | 6FBAPP/DDS(5:5)-BTDA | 80 | 262 | 49.9 | 41.3 | 0.6 | 87.71 | 0 | 0.1 | 20.9 |
| Comp. Ex. 9 | mBAPS-HPMDA/BPDA(7:3) | 40 | 245 | 42.5 | 1.88 | 0.41 | 89.99 | 0 | 0.3 | 70.8 |

TABLE 1-continued

Table 1 Thermal and optical properties of polyimide film

| PI film | PI composition | Film baking condition Surface drying temperature (° C.) | Thermal properties Tg (° C.) | Thermal properties CTE (50-200° C.) (ppm/° C.) | Optical properties YI | Optical properties Haze (%) | Optical properties TT (%) | Optical properties T-360 (%) | Optical properties in-lane phase difference R0 (nm) | Optical properties thickness phase difference Rth (nm) |
|---|---|---|---|---|---|---|---|---|---|---|
| Comp. Ex. 10 | mBAPS-HPMDA/BPDA(7:3) | 50 | 245 | 42.5 | 1.85 | 0.23 | 89.99 | 0 | 0.3 | 50.9 |
| Comp. Ex. 11 | mBAPS-HPMDA/BPDA(7:3) | 60 | 245 | 42.5 | 1.86 | 0.25 | 89.99 | 0 | 0.4 | 40.3 |

It is known from Comparative Examples 1 to 4 that if the polyimide used to form the polyimide film is not added with specific aromatic dianhydrides, such as BPDA, OPDA, BPADA, BTDA, its transmittance with respect to light having a wavelength of 360 nm is greater than 65%, and it does not have UV absorption characteristics. In contrast, the polyimide film of the present invention has a transmittance of less than 10% with respect to light having a wavelength of 360 nm due to the addition of 20 mol % aromatic dianhydride.

According to Examples 5 and 10 and Comparative Examples 3 and 5, it is known that the polyimide film having a thickness of 10 μm and formed from the diamine containing the sulfonyl group has a phase difference of less than 15, and if the diamine used to manufacture the polyimide film contains the diamine without the sulfonyl group, the phase difference of the polyimide film will increase. This is because the phase difference value of the polyimide formed from the linear dianhydride will be determined by the type of diamine, such as m-BAPS and DDS. From another point of view, it can be seen from the results of Example 5 and Comparative Example 5 that the polyimide film of the present invention does not contain the diamine without the sulfonyl group and therefore has a relatively low phase difference.

Comparative examples 6 to 8 use two kinds of diamine monomers and one kind of dianhydride monomer to synthesize polyimide. Such polyimide can produce polyimide film with a phase difference of less than 30, however, the yellowness of this polyimide film will be greater than 20.

According to Example 11 and Comparative Example 2, it is known that increasing the addition amount of the aromatic dianhydride that is capable of absorbing UV will elevate the UV absorption efficiency of the polymerized polyimide film accordingly.

It can be seen from Examples 5 to 8 and Comparative Examples 9 to 11 that the surface drying temperature can affect the phase difference value of the polyimide film. When the polyimide film is just formed (i.e., when the solvent has not been removed and in a wet film state), the higher the surface drying temperature is, the lower the phase difference value of the polyimide film is. Therefore, it can be seen that the present invention influences the molecular arrangement of polyimide by surface drying, thereby affecting the phase difference of the polyimide film.

It is known from Examples 1-12 that the phase difference value of the polyimide films synthesized with HPMDA is lower than that of the polyimide film synthesized with B1317. As for the Tg value, the polyimide film synthesized by B1317 is higher than that of the polyimide film synthesized by HPMDA. Because the structure of B1317 is relatively rigid, the molecular structure is not easy to bend.

In addition, it can also be seen from Examples 1-12 that the polyimide film of the present invention has a total light transmittance of greater than 89%, a glass transition temperature of greater than 230° C., a coefficient of thermal expansion (CTE) of less than 50 ppm/° C., and a phase difference of less than 25 nm.

From Examples 1 to 12 and Comparative Examples 1 to 2, it is known that if the proportion of aliphatic dianhydride in the polyimide is greater than or equal to 70 mol %, the phase difference value will be less than 36.

In summary, the present invention introduces a specific monomer structure into polyimide, so that the polyimide film prepared therefrom is not only transparent and colorless, but also has low phase difference and UV absorption characteristics.

Those described above are only preferred embodiments of the present invention, and should not be used to limit the implementation scope of the present invention. Therefore, all the simple and equivalent changes and modifications made according to the claims and the specification of the present application still fall within the scope of the present invention.

What is claimed is:

1. A polyimide film, comprising a polyimide having a structure represented by formula (I):

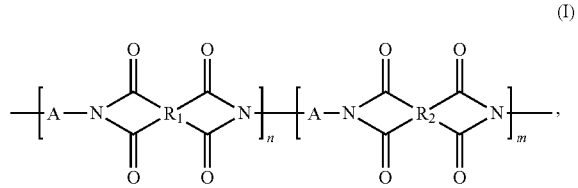

wherein A is a residue group of an aromatic diamine containing a sulfonyl group in its main chain moiety, $R_1$ is a residue group of an aromatic dianhydride, $R_2$ is a residue group of an aliphatic dianhydride, m and n are each independently a positive integer, a diamine monomer constituting the polyimide is only composed of the aromatic diamine containing the sulfonyl group in its main chain moiety, and the polyimide is surface-dried at 75° C. to 155° C. in the process of forming the polyimide film, and wherein the aromatic diamine containing the sulfonyl group comprises 4,4'-bis(3-aminophenoxy) diphenyl sulfone, or 4,4'-bis(4-aminophenoxy) diphenyl sulfone.

2. The polyimide film of claim 1, wherein the aromatic dianhydride comprises 3,3',4,4'-biphenyltetracarboxylic dianhydride, 3,3',4,4'-tetracarboxylic benzophenone dianhydride, 2,3,3',4-biphenyltetracarboxylic dianhydride, 2,3,3',4-tetracarboxylic benzophenone dianhydride, bisphenol A type diether dianhydride or 4,4-oxydiphthalic anhydride.

3. The polyimide film of claim 1, wherein the aliphatic dianhydride comprises bicyclo[2.2.2]oct-7-ene-2,3,5,6-tetracarboxylic dianhydride, 1,2,4,5-cyclohexanetetracarboxylic dianhydride, cyclobutane tetracarboxylic dianhydride or other hydrogenated aromatic tetracarboxylic dianhydrides.

4. The polyimide film of claim 1, wherein a ratio of the n to the m ranges from 1:19 to 3:7.

5. The polyimide film of claim 1, wherein the polyimide film has a transmittance of less than 10% with respect to 360 nm visible light and has a yellowness of less than 3.

6. The polyimide film of claim 1, wherein the polyimide film has a phase difference of less than or equal to 25, a thermal expansion coefficient of less than 50 ppm/° C., and a glass transition temperature of greater than 230° C.

7. A manufacturing method of a polyimide film, comprising the following steps:
    coating a substrate with a solution containing polyimide to obtain a coated substrate; and
    surface-drying the coated substrate at 75° C. to 155° C. and then performing a heat treatment at a temperature of greater than or equal to 200° C.;

wherein the polyimide has a structure represented by formula (I):

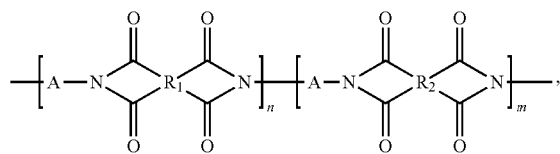

wherein A is a residue group of an aromatic diamine containing a sulfonyl group in its main chain moiety, $R_1$ is a residue group of an aromatic dianhydride, $R_2$ is a residue group of an aliphatic dianhydride, m and n are each independently a positive integer, and a diamine monomer constituting the polyimide is only composed of the aromatic diamine containing the sulfonyl group in its main chain moiety, and
    wherein the aromatic diamine containing the sulfonyl group comprises 4,4'-bis(3-aminophenoxy) diphenyl sulfone, or 4,4'-bis(4-aminophenoxy) diphenyl sulfone.

* * * * *